(12) United States Patent
Wu et al.

(10) Patent No.: US 8,488,530 B2
(45) Date of Patent: Jul. 16, 2013

(54) METHOD AND APPARATUS OF DYNAMIC CHANNEL ASSIGNMENT FOR A WIRELESS NETWORK

(75) Inventors: Cheng-Hsuan Wu, Taipei (TW); Jiunn-Tsair Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1646 days.

(21) Appl. No.: 11/465,805

(22) Filed: Aug. 19, 2006

(65) Prior Publication Data

US 2008/0019345 A1 Jan. 24, 2008

(30) Foreign Application Priority Data

Jul. 18, 2006 (TW) ................................ 95126196 A

(51) Int. Cl.
*H04W 72/04* (2009.01)
*H04W 4/00* (2009.01)
*H04L 12/28* (2006.01)

(52) U.S. Cl.
USPC ........... 370/329; 370/341; 370/431; 455/450; 455/452.1; 455/452.2

(58) Field of Classification Search
USPC .......................................... 370/341, 329, 431
See application file for complete search history.

(56) References Cited

U.S. PATENT DOCUMENTS

| | | | |
|---|---|---|---|
| 5,933,420 A * | 8/1999 | Jaszewski et al. | 370/329 |
| 6,081,722 A * | 6/2000 | Duque-Anton et al. | 455/452.2 |
| 6,434,113 B1 | 8/2002 | Gubbi | |
| 6,504,829 B1 | 1/2003 | Young et al. | |
| 6,977,912 B1 | 12/2005 | Porter et al. | |
| 6,987,769 B1 | 1/2006 | Dougherty et al. | |
| 2003/0125040 A1 * | 7/2003 | Walton et al. | 455/450 |
| 2004/0218563 A1 * | 11/2004 | Porter et al. | 370/329 |
| 2005/0075104 A1 * | 4/2005 | Jain et al. | 455/423 |
| 2006/0064497 A1 * | 3/2006 | Bejerano et al. | 709/228 |
| 2006/0227751 A1 * | 10/2006 | Theobold et al. | 370/338 |
| 2007/0082677 A1 * | 4/2007 | Hart et al. | 455/456.1 |
| 2008/0248813 A1 * | 10/2008 | Chatterjee | 455/456.2 |
| 2008/0285530 A1 * | 11/2008 | Dietrich et al. | 370/338 |
| 2008/0285670 A1 * | 11/2008 | Walton et al. | 370/338 |

FOREIGN PATENT DOCUMENTS

| | | |
|---|---|---|
| TW | 200616381 | 5/2006 |
| TW | 200620932 | 6/2006 |

* cited by examiner

*Primary Examiner* — Anthony Addy
*Assistant Examiner* — Tangela T. Chambers

(57) ABSTRACT

Disclosed is a method and apparatus for dynamic channel assignment (DCA) in a wireless network, which describes the complex channel assignment problem with a decoding problem. The invention describes the decoding problem with a normal graph and specifies all the local rules enforced by all the nodes at access point sides and subscriber sides. Then, the invention carries out the sum-product algorithm to solve the DCA. It is not only a fully-distributed low-complexity DCA technology, but also significantly increases the network throughput. The invention further adopts the concept of subscriber exclusive region to guarantee the link quality between a subscriber and an access point.

14 Claims, 7 Drawing Sheets

METHOD AND APPARATUS OF DYNAMIC CHANNEL ASSIGNMENT FOR A WIRELESS NETWORK

FIELD OF THE INVENTION

The present invention relates to a method and apparatus of dynamic channel assignment for a wireless network.

BACKGROUND OF THE INVENTION

As the demands on the versatile wireless communication service, such as voice, data and multimedia, increase rapidly, the wireless local area network (WLAN) also grows fast. To meet the ever-growing demands, more and more wireless nodes are used in addition to the wired service. As the technology matures and the cost reduced, WLAN is gaining popularity.

In a WLAN, an access point (AP) is usually individually set up without the overall planning. Under such circumstances, if a nearby AP uses the same frequency, the mutual interference will exist between the APs. Therefore, it is imperative to prevent such interference and maintain a high carrier-to-interference ration (CIR) to guarantee the high data rate.

In recent years, a multiple-input-multiple-output (MIMO) multi-user technology is developed. This technology greatly reduces the co-channel interference (CCI) and increases the system capacity. In MIMO technology, every AP and every subscriber use a plurality of antennas to serve the multiple users in the same frequency band. This technology is considered as a viable solution for the next generation mobile communication and WLAN. In the MIMO technology, the subscribers at different angular positions can share the same network resource if the separation angle among the subscribers is sufficiently large.

After MIMO is applied to a WLAN, the channel assignment plays an important role in increasing the network throughput. In the conventional wireless communication network, channel assignment is categorized, based on the CCI elimination strategy, into three categories. The first is the fixed channel assignment (FCA), in which a cell is assigned a pre-determined set of channels. The FCA method is simple, yet suffers poor performance when the traffic is non-stationary or non-uniform.

The second is called dynamic channel assignment (DCA). The conventional DCA allows all the channels in the universal set to be assigned to any service requesting subscriber as long as the CIR is within the limit. The conventional DCA has the problems of higher complexity and requiring the feedback of a large amount of channel state information.

The third category is the hybrid channel assignment (HCA). This method is suitable for compromise between the complexity and the performance. The conventional DCA and the HCA both have good performance for mobile systems with the same cells. Unfortunately, to provide service to the subscribers around the hot spot, the placement of APs in the WLAN is always non-uniformly distributed. Even worse, it is not easy to measure the CIR at the receiving end, and higher CIR does not account for good service quality before the antenna beam forming and frequency equalization.

SUMMARY OF THE INVENTION

The present invention has been made to overcome the above-mentioned drawback of conventional channel assignment methods to provide a method and apparatus of dynamic channel assignment for a wireless network. By using a normal graph, the present invention provides a fully-distributed and low complexity DCA technology for a non-uniformly-distributed wireless network.

Based on the frame of the normal graph, the present invention uses the available subscriber position information to define soft information to reflect the local traffic condition. Then, the soft information is exchanged between the AP and the subscriber repeatedly, and a standard process is used to repeatedly optimize the channel assignment in the wireless network. The result greatly improves the network throughput. The present invention further adopts the notion of subscriber exclusive region (SER) to guarantee the link quality between each subscriber and the AP.

Accordingly, the DCA method of the present invention mainly includes the following steps of: (a) constructing a normal graph to model the environment of the APs and the subscribers in a wireless network, (b) based on the channel correlation in the wireless network, defining the local constraint rule for all the nodes at AP sides and subscriber sides in the normal graph, and (c) repeatedly performing a standard process for the information exchange between the AP nodes and the subscriber nodes to achieve the dynamic channel assignment.

Based on the above method, the DCA apparatus of the present invention includes a normal graph modeling unit, a local constraint rule regulation unit, and a dynamic channel assignment unit to realize the DCA method.

In comparison of the present invention and the two commonly used conventional methods, namely, fixed angular channel assignment and space-division multiple access (SDMA), the present invention can serve more subscribers by increasing the system capacity 30-200% under the same bit error rate (BER).

The foregoing and other features, aspects and advantages of the present invention will become better understood from a careful reading of a detailed description provided herein below with appropriate reference to the accompanying drawings.

DETAILED DESCRIPTION OF THE PREFERRED EMBODIMENTS

The normal graph was originally used in the decoding process in a communication system. By observing the log-likelihood ratio (LLR) exchange in a normal graph and the characteristics of normal graph discrete operation, the present invention transforms a complicated DCA problem into a decoding problem.

The present invention observes that as long as a normal graph framework can be used to model the DCA problem, the local rule for all the nodes in the normal graph are well-defined and by using the message-passing through the pre-assigned local agents, the DCA problem can be easily solved with a standard process.

Figure 1:
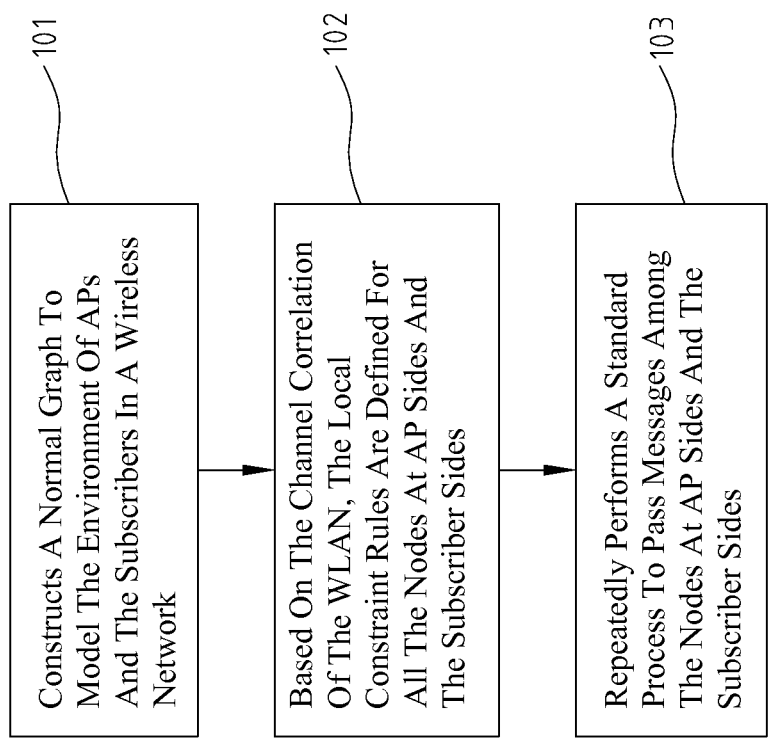
FIG. 1 illustrates the operating steps of the DCA method for a wireless network according to the invention.

FIG. 1 illustrates the operating steps of the DCA method according to the invention. As shown in step 101, the method constructs a normal graph to model the environment of APs and the subscribers in a wireless network. The normal graph includes a plurality of nodes at AP sides, a plurality of nodes at subscriber sides, and a plurality of edges. The normal graph is also a representation of a group of mutually-interactive check rules. Based on the channel correlation of the WLAN, the local constraint rules are defined for all the nodes at AP sides and the subscriber sides (SS), as shown in step 102. In step 103, the method repeatedly performs a standard process to pass messages among the nodes at AP sides and the subscriber sides to achieve the dynamic channel assignment. The standard process is a well-known sum-product algorithm.

Figure 2A:
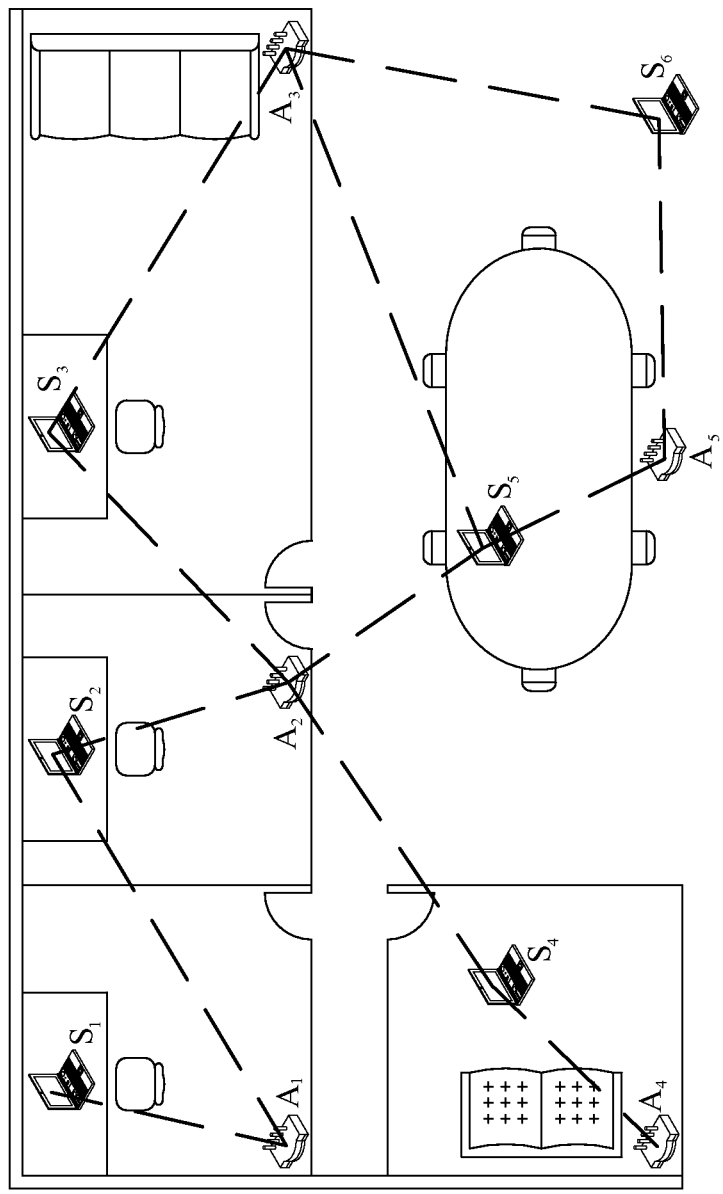
FIG. 2A shows an example of an actual WLAN using DCA.
Figure 2B:
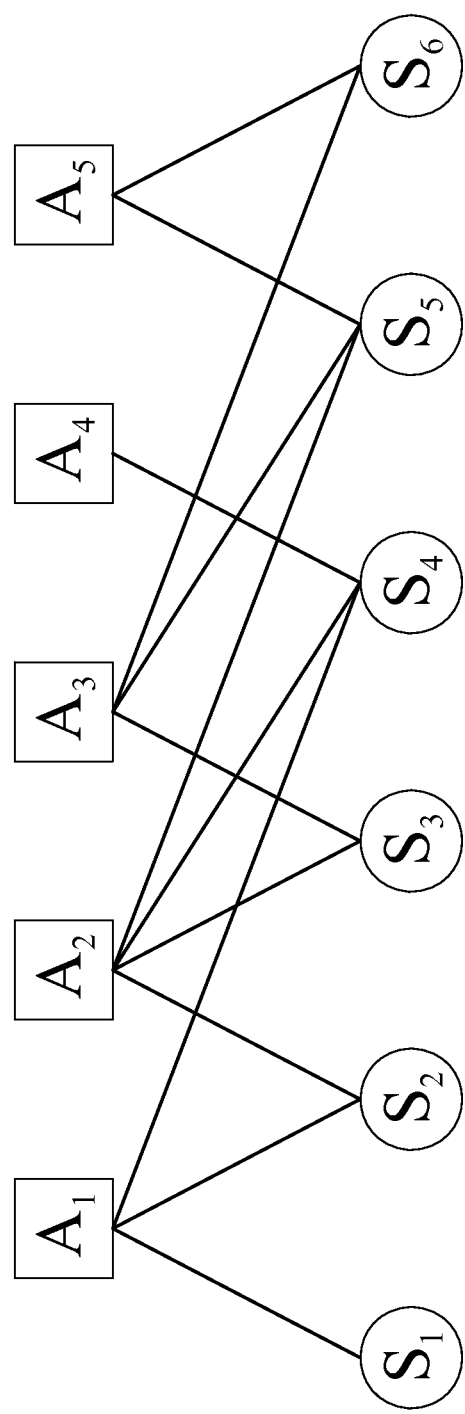
FIG. 2B shows a normal graph of the WLAN in FIG. 2A.

FIG. 2A shows an example of an actual WLAN using DCA. The WLAN includes a plurality of APs and subscribers. The WLAN in FIG. 2A is constructed as a normal graph in FIG. 2B. The APs in FIG. 2A are mapped to the rectangular nodes in FIG. 2B, and the notebook PC user (the subscriber) are mapped to the circular nodes. The constraint rules for the rectangular nodes are defined in accordance with the example in FIG. 2C. If two notebooks are mapped to the same AP and if their channel correlation exceeds a pre-assigned constant, e.g., 0.6, the links for these two notebooks cannot be established at the same time. The constraint rules for the circular nodes are defined in accordance with FIG. 2D. Because every subscriber requests a channel for message-passing, the legitimate codeword has exact one non-zero factor.

Figure 2C:
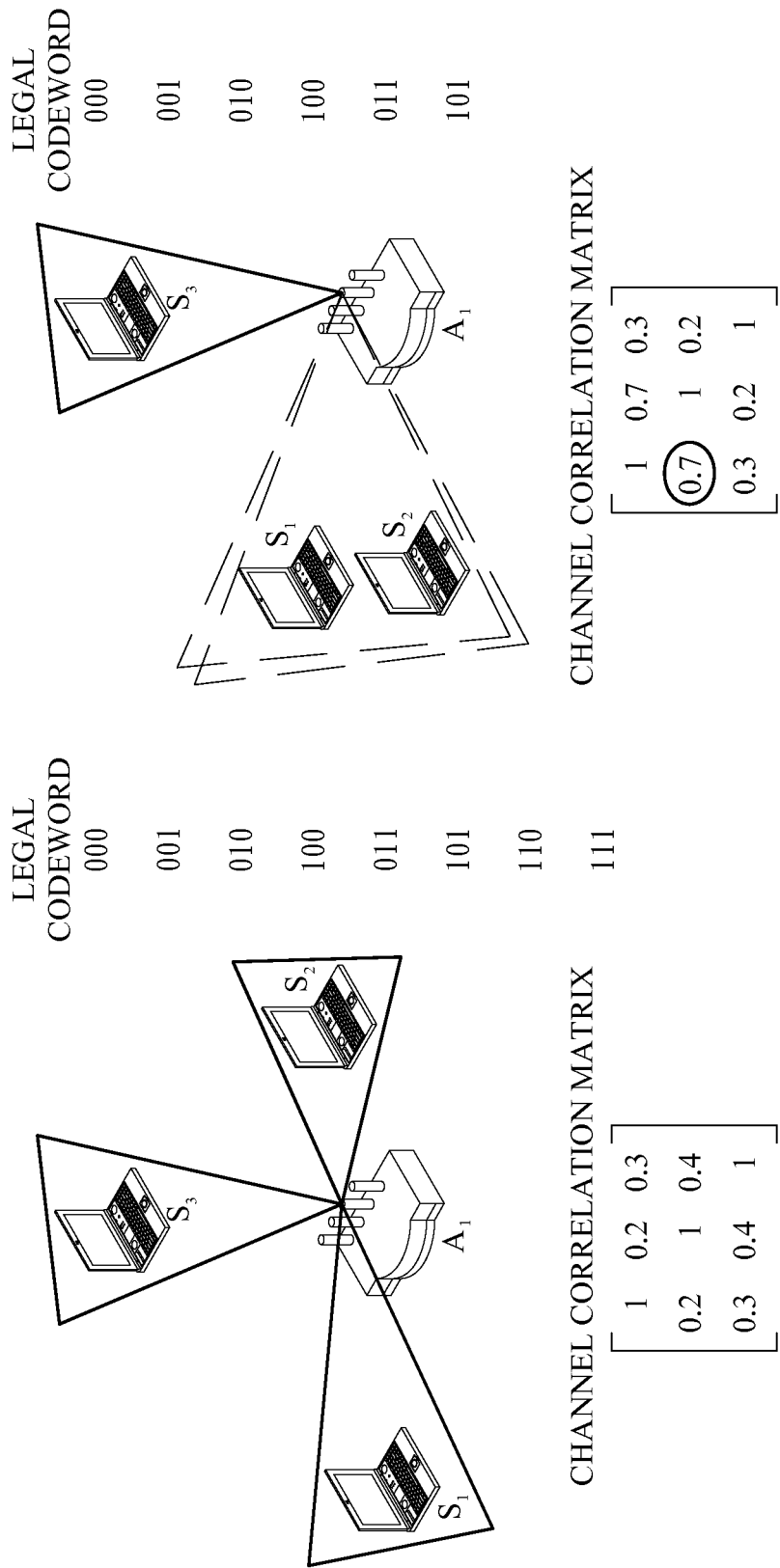
FIG. 2C shows an example of the constraint rule for a rectangular node in FIG. 2B.
Figure 2D:
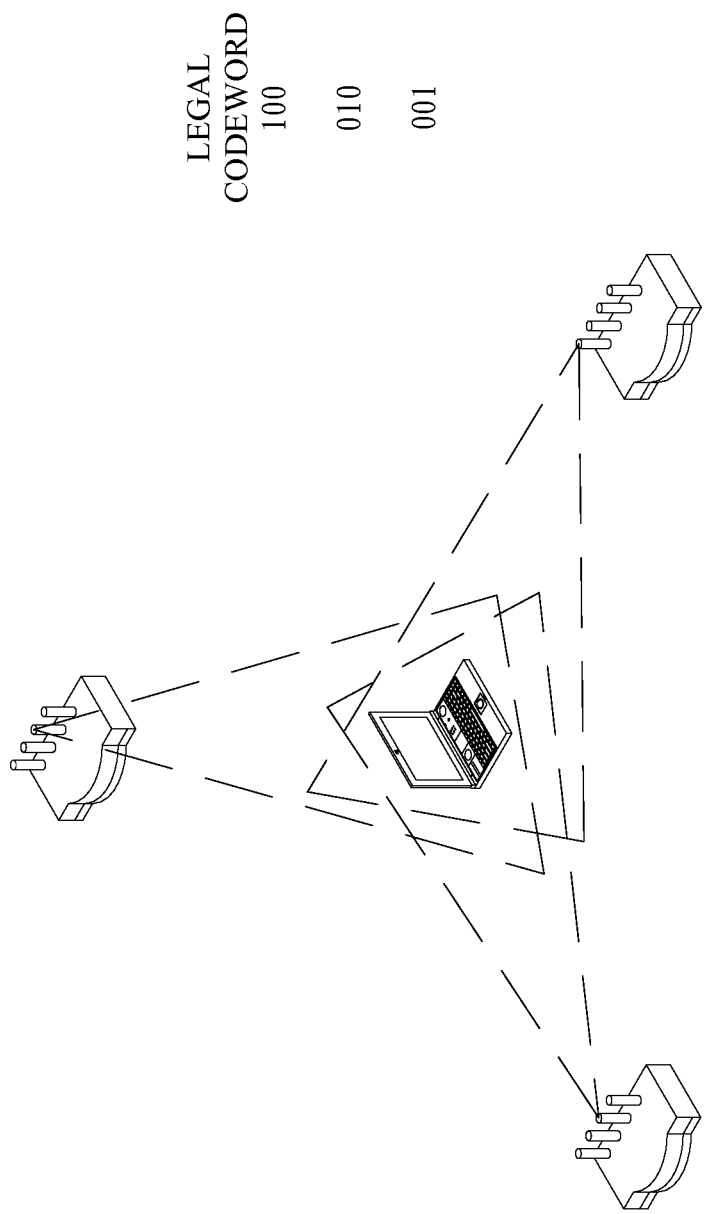
FIG. 2D shows an example of the constraint rule for a circular node in FIG. 2B.

FIG. 2C shows an example of the local constraint rule for an AP node $A_1$. The channel correlation function of the left side, such as channel correlation matrix, has all the elements less than the pre-assigned 0.6. On the other hand, if the channel correlation matrix of the right side includes elements $c_{12}$ and $c_{21}$ having the value of 0.7, which is greater than the pre-assigned 0.6, the legitimate codeword will not be 11x, i.e., 110 and 111. FIG. 2D shows an example of the constraint rule for a circular node in FIG. 2B.

After the normal graph is constructed and the local constraint rules are defined for all the AP nodes and the subscriber nodes in the normal graph, the present invention uses the sum-product algorithm to enable the message-passing among the AP nodes and the subscriber nodes and converge to the last legitimate codeword to achieve the dynamic channel assignment.

In other words, the sum-product algorithm is the tool for the message-passing among the AP nodes and the subscriber nodes in the WLAN, through which the channel resource assignment is optimized to increase the system capacity. According to the location information of each subscriber, the present invention further defines a subscriber exclusive region (SER) to guarantee the link quality between each subscriber and the AP.

In step 101, the normal graph is constructed by the following substeps.

Substep 1 is to define two types of nodes, the AP node and the subscriber node, to represent the APs and subscribers in the WLAN. As the example of FIG. 2A, the WLAN includes five APs and six subscribers, which are represented with AP nodes $A_1$-$A_5$, and subscriber nodes $S_1$-$S_6$.

Substep 2 is to link an AP node to a subscriber node with an edge when the subscriber can be detected by the AP. The edge set represents a codeword. Each edge is related to a codeword bit, and each codeword bit can be either 0 or non-zero, such as 1, without the loss of generality. A non-zero implies that the corresponding subscriber and the AP are passing messages. A zero implies that the edge is an interference link.

In other words, each codeword describes a DCA solution. The present invention only needs to determine the optimal codeword in accordance with the local constraint rules for all the AP nodes and the subscriber nodes. The following describes the local constraint rule for each node.

For simplicity, the WLAN is assumed to be a single-channel and single-rate environment. In other words, a subscriber currently using a link only receives service from a single AP. Also, the service is only limited to a single channel during a time slot or a frequency band. Under such conditions, the local constraint rule for each subscriber side node is to assure that exactly one 1 exists in all the codeword bits corresponding to the edges linking to the subscriber node. However, this rule can be easily extended to multi-channel system capable of transmitting multi-rate data, as long as multiple 1s can exist in the codeword bits.

The following describes the local constraint rule for each AP node. For each subscriber, the present invention uses the channel information of the subscriber to define a subscriber exclusive region to guarantee the link quality between the subscriber and the AP. When a subscriber is linked to an AP, an SER is defined, and other subscribers cannot be assigned with the same channel. If other subscribers have the similar channel, the channel correlation will exceed a pre-assigned threshold.

It is worth noticing that in a MIMO system, an SER is useless for a subscriber using different APs because the subscriber has angle selectivity on the channel. According to the channel correlation matrix information, an SER allows a subscriber to link with an AP and obtain the protection to reduce the interference from other subscribers so as to guarantee the link quality between each subscriber and the AP.

Take access point $A_1$ as an example. Access point $A_1$ is linked to five subscribers $S_1$-$S_5$. Based on the channel correlation matrix information, Using $A_1$ as the tip vertex, if the subscriber $S_1$ and $S_2$ are close in terms of angle, the channel using the same AP will not be assigned to $S_1$ and $S_2$ simultaneously during the same time slot or in the same frequency band. Therefore, the legitimate codeword for $A_1$ is not {11xxx}, where "x" implies a non-restriction. Similarly, with $A_1$ as the tip vertex, if the subscriber $S_3$, $S_4$ and $S_5$ are close in terms of angle, the legitimate codeword for $A_1$ is not {xx111, xx110, xx101, xx011}. Similarly, the illegitimate codeword can be determined by using the distance distribution information.

The following describes how the subscriber location information can be translated into soft information and how to calculate the soft information of each node.

The initial value of the soft information SI from subscriber node $S_i$ to AP node $A_j$ is defined as the probability that node $A_j$ serves node $S_i$, and $$SI(S_i, A_j, 1) = 1 - SI(S_i, A_j, 0)$$
$$= \lambda \cdot \exp(d_{ij}/R_j)$$

where SI(x, y, b) represents the soft information from node x to node y, and the codeword bit corresponding to the linking edge is b; $d_{ij}$ is the distance between $S_i$ and $A_j$, $R_j$ is the convergence radius of node $A_j$; $\lambda$ is the normalization factor, and when Si is on the edge of Aj, $\lambda$ makes the probability $SI(S_i, A_j, 1)$ equal to ½.

After each AP receives the SI from the related subscriber, the AP uses the codebook to calculate its own SI and returns the SI to the related subscriber. Using the aforementioned 5 subscribers $S_1$-$S_5$ with the AP $A_1$ as an example, the SI from AP to subscriber is calculated as the following:

$$SI(A_1, S_1, 1) = \lambda_{11}(1 - SI(S_2, A_1, 0));$$

$$SI(A_1, S_1, 0) = \lambda_{11}$$

and $SI(A_1, S_3, 1) = SI(A_1, S_3, 0) = 0.5$. Using the same method, the SI from $A_1$ to $S_1$, $S_4$, $S_5$ can be calculated. If there are many subscribers linking to an AP, the constraint rule can be divided into several simpler constraint rules to reduce the SI computation complexity.

In the sum-product algorithm, a complete iteration further includes (1) using SI from the AP node to the subscriber node, and (2) meeting the data transmission rate to calculate the SI from the subscriber node to the AP node.

At the ending of each iteration process, the present invention further calculates the possible interval of each codeword bit to determine whether the iterative algorithm is convergent. At the ending of each iteration process, the codeword bit between subscriber $S_j$ and the AP $A_i$ is determined as follows.

If $SI(S_i, A_j, 1) SI(A_j, S_i, 1) > SI(S_i, A_j, 0) SI(A_j, S_i, 0)$, the codeword bit is temporarily determined to be 1; otherwise, O. If all the temporary determinations meet the local constraint rules, the iteration algorithm of the present invention is convergent. Because in the severely overloaded WLAN, there does not exist a visible solution for the channel assignment problem. Therefore, the iterative algorithm of the present invention does not guarantee convergence under all the circumstances. However, in comparison with the conventional DCA technology, the simulated results show that the present invention always consistently maintains a low computation complexity and provide a better solution.

Figure 3:
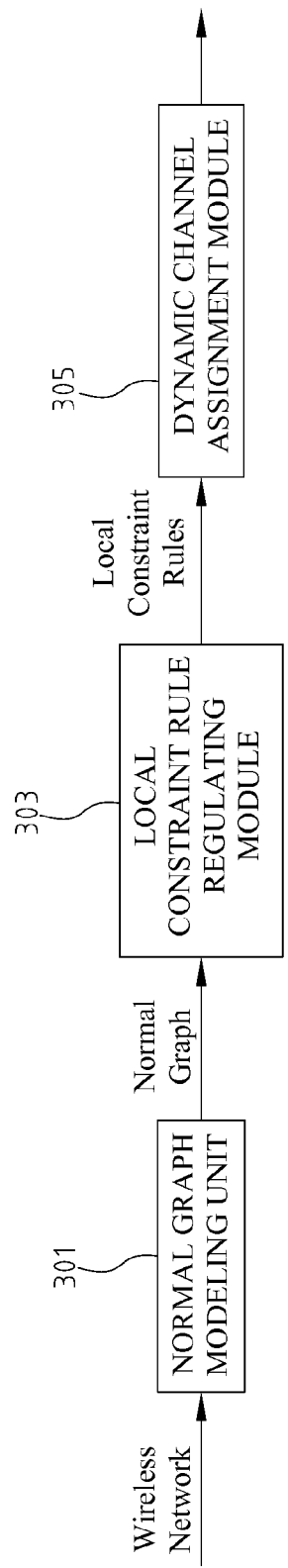
FIG. 3 shows a schematic view of a DCA apparatus for a wireless network of the present invention.

FIG. 3 shows a schematic view of an apparatus of DCA for a wireless network. As shown in FIG. 3, the DCA apparatus includes a normal graph modeling unit 301, a local constraint rule regulating module 303, and a dynamic channel assignment module 305.

Normal graph modeling unit 301 uses a normal graph to model the environment of the AP and the subscribers in the WLAN. As aforementioned, the normal graph includes a plurality of AP nodes, a plurality of subscriber nodes, and a plurality of edges. The normal graph is also a representation of a group of mutually-interactive check rules. Based on the channel correlation of the WLAN, the local constraint rule regulating module 303 defines the local constraint rules for all the AP side nodes and the subscriber side nodes. The dynamic channel assignment module 305 uses the local constraint rules to repeatedly perform a standard process to pass messages among the AP nodes and the subscriber nodes to achieve the dynamic channel assignment.

The normal graph construction, local constraint rules, and the standard process are the same as described earlier.

Figure 4:
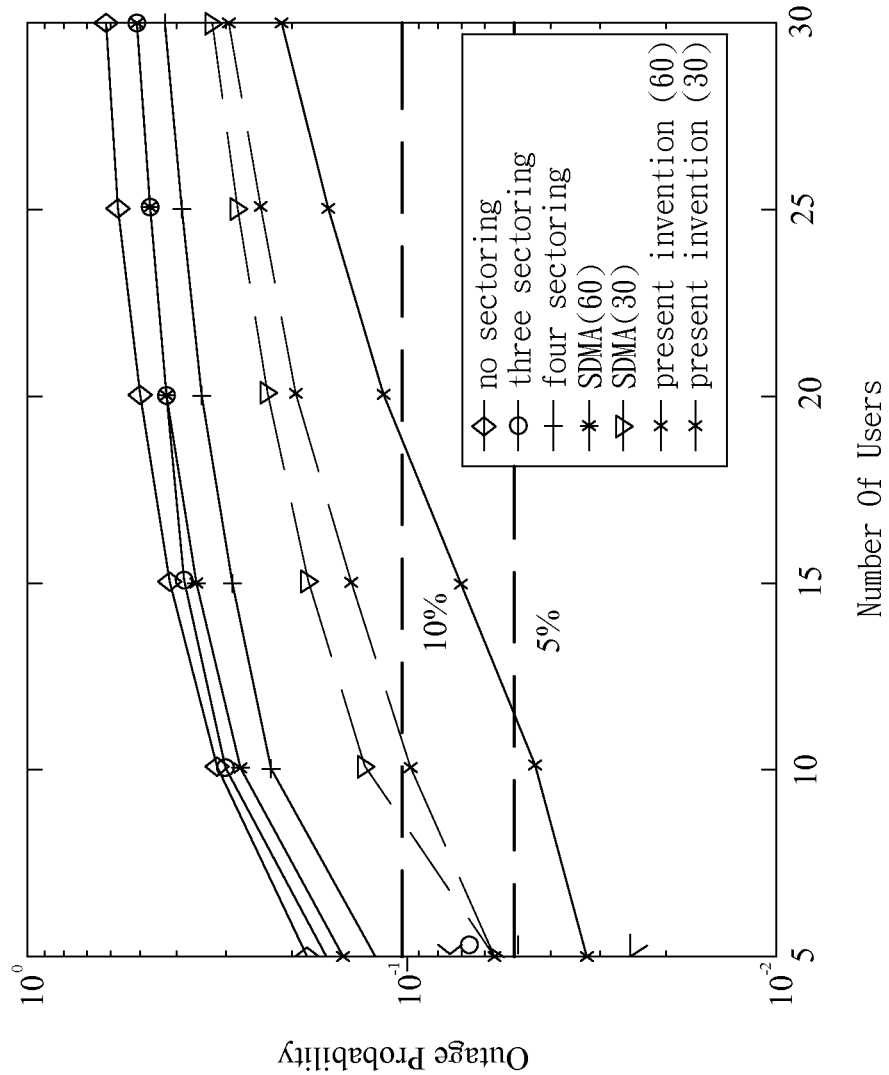
FIG. 4 shows the performance comparison between the present invention and the conventional channel assignment technologies, with the x-axis indicating the number of the subscribers, and the y-axis indicating the outage probability.

To prove the effectiveness of the present invention, a series of simulations are performed to compare with the result of the conventional DCA methods, such as the fixed angle channel assignment technology and the space-division multiple access (SDMA) technology. FIG. 4 shows the comparison with the conventional technologies of (1) no sectoring SER fixed angle channel assignment, (2) 120° three-sector SER fixed angle channel assignment, (3) 90° four-sector SER fixed angle channel assignment, and (4) SDMA. The x-axis indicates the number of users in the system, and y-axis indicates the outage probability. The 30° and 60° of the SDMA and the present invention indicate the RF broadcast angle.

FIG. 4 shows that when the same BER is considered, the present invention can serve more users and increases the system capacity by 30-200%.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A method of dynamic channel assignment for a wireless network, comprising the steps of:
    constructing a normal graph to model an environment of one or more access points (APs) and one or more subscribers in said wireless network, said normal graph including a plurality of AP nodes, a plurality of subscriber nodes, and a plurality of edges, said normal graph being a representation of a group of mutually-interactive check rules;
    based on channel correlation of said wireless network to avoid co-channel interference, defining one or more local constraint rules for all said AP nodes and said subscriber nodes for the dynamic channel assignment, and
    repeatedly performing a standard process to pass messages among said AP nodes and said subscriber nodes to achieve the dynamic channel assignment, said messages being based on soft information between said AP nodes and said subscriber nodes;
    wherein said soft information from a subscriber node to an AP node is a probability that the AP node serves the subscriber node defined as a function of a distance between the subscriber node and the AP node, and a convergence radius of the AP node, wherein said local constraint rules for each of said subscriber nodes further include: in a single-channel and single-rate environment, assuring that exactly one 1 exists in all codeword bits corresponding to the edges linking to the subscriber node; and in a multi-channel system capable of transmitting multi-rate data, allowing multiple 1 s to exist in said codeword bits.

2. The method as claimed in claim 1, wherein said standard process is a sum-product algorithm.

3. The method as claimed in claim 1, wherein said step of constructing a normal graph further includes the steps of:
    representing said APs and said subscribers in said wireless network with said AP nodes and said subscriber nodes by associating each AP with an AP node and each subscriber with a subscriber node respectively; and
    linking an AP node to a subscriber node with an edge when the subscriber associated with the subscriber node is detectable by the AP associated with the AP node, and associating the edge with a codeword bit.

4. The method as claimed in claim 1, wherein said wireless network is a wireless local area network.

5. The method as claimed in claim 1, wherein a subscriber exclusive region is defined for each of said subscribers to guarantee link quality by using channel information of the subscriber.

6. The method as claimed in claim 1, wherein said local constraint rules for each of said AP nodes further include:

when a subscriber node is linked to an AP node, other subscriber nodes are not assigned to a same channel if other subscriber nodes have a similar channel correlation.

7. The method as claimed in claim 6, wherein said similar channel correlation is that the channel correlation exceeds a pre-assigned threshold.

8. The method as claimed in claim 1, wherein a subscriber exclusive region is defined to guarantee link quality between each of said subscribers and each of said APs in accordance with location information of each of said subscribers.

9. The method as claimed in claim wherein said subscriber exclusive region allows each of said subscribers to link with each of said APs and obtain protection to reduce interference from other subscribers so as to guarantee link quality between each of said subscribers and each of said APs.

10. The method as claimed in claim 8, wherein said location information is translated into related soft information and said related soft information is exchanged among said subscribers and said APs to achieve dynamic channel assignment.

11. An apparatus of dynamic channel assignment for a wireless network, comprising:
a normal graph modeling unit constructing a normal graph to model an environment of access points (APs) and subscribers in said wireless network, said normal graph including a plurality of AP nodes, a plurality of subscriber nodes, and a plurality of edges, said normal graph being a representation of a group of mutually-interactive check rules;
a local constraint rule regulating module defining a group of local constraint rules for all said AP nodes and said subscriber nodes for the dynamic channel assignment based on channel correlation in said wireless network to avoid co-channel interference, and
a dynamic channel assignment module for, based on said local constraint rules, repeatedly performing a standard process to pass messages among said AP nodes and said subscriber nodes to achieve the dynamic channel assignment, said messages being based on soft information between said AP nodes and said subscriber nodes;
wherein said soft information from a subscriber node to an AP node is a probability that the AP node serves the subscriber node defined as a function of a distance between the subscriber node and the AP node, and a convergence radius of the AP node, wherein said local constraint rules for each of said subscriber nodes further include: in a single-channel and single-rate environment, assuring that exactly one 1 exists in all codeword bits corresponding to the edges linking to the subscriber node; and in a multi-channel system capable of transmitting multi-rate data, allowing multiple 1 s to exist in said codeword bits.

12. The apparatus as claimed in claim 11, wherein said wireless network is a wireless local area network.

13. The apparatus as claimed in claim 11, wherein said standard process is a sum-product algorithm.

14. The apparatus as claimed in claim 11, wherein a corresponding structure between said normal graph and said wireless network is as follows:
each of said AP nodes representing an associated AP and each of said subscriber nodes representing an associated subscriber in said wireless network; and
each of said edges linking an AP node to a subscriber node when the subscriber associated with the subscriber node is detectable by the AP associated with the AP node.

* * * * *